US011276306B1

(12) United States Patent
Valdes (10) Patent No.: US 11,276,306 B1
(45) Date of Patent: Mar. 15, 2022

(54) LOCATION TRACKING AFTER POWER LOSS

(71) Applicant: Lytx, Inc., San Diego, CA (US)

(72) Inventor: Angel Valdes, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 16/841,470

(22) Filed: Apr. 6, 2020

(51) Int. Cl.
*G08G 1/127* (2006.01)
*H04W 4/029* (2018.01)

(52) U.S. Cl.
CPC ............ *G08G 1/127* (2013.01); *H04W 4/029* (2018.02)

(58) Field of Classification Search
CPC .............................. G08G 1/127; H04W 4/029
See application file for complete search history.

(56) References Cited

U.S. PATENT DOCUMENTS

| 7,015,830 | B2* | 3/2006 | Flick | B60R 25/102 340/989 |
| 9,979,924 | B1* | 5/2018 | Fink | H04N 9/8042 |
| 2013/0316737 | A1* | 11/2013 | Guba | G08G 1/20 455/456.4 |
| 2015/0036517 | A1* | 2/2015 | Ruutu | H04W 24/10 370/252 |
| 2016/0105840 | A1* | 4/2016 | Smiley | G08B 7/06 455/418 |
| 2019/0363843 | A1* | 11/2019 | Gordaychik | H04L 1/0013 |
| 2020/0196121 | A1* | 6/2020 | Lee | G06Q 50/30 |

* cited by examiner

*Primary Examiner* — Muthuswamy G Manoharan
(74) *Attorney, Agent, or Firm* — Van Pelt, Yi & James LLP (57) ABSTRACT

A system for locating a vehicle event recorder after power loss includes an interface and a processor. The interface is configured to receive an indication of disconnection from a vehicle power source. The processor is configured to determine location information for a vehicle event recorder and indicate to transmit the location information.

17 Claims, 6 Drawing Sheets

LOCATION TRACKING AFTER POWER LOSS

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder mounted on a vehicle typically includes a set of sensors—for example, video recorders, audio recorders, accelerometers, gyroscopes, vehicle state sensors, global positioning system (GPS), etc., that report data, which is used to determine the occurrence of an anomalous event. The vehicle event recorder and sensors require are typically powered by the power system for the vehicle (e.g., the vehicle battery, the vehicle alternator, etc.). In some cases, the vehicle event recorder is disconnected from the vehicle power system—for example, due to theft, vandalism, or modification by the driver. However, without power the vehicle event recorder and sensors no longer are able to run, creating a problem in that the vehicle event recorder can no longer report its location.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for locating a vehicle event recorder after power loss is disclosed. The system comprises an interface and a processor. The interface is configured to receive an indication of disconnection from a vehicle power source. The processor is configured to determine location information for a vehicle event recorder and indicate to transmit the location information.

A system for locating a vehicle event recorder after power loss comprises a vehicle event recorder system coupled to a backup battery system. The vehicle event recorder system is configured to transmit location data (e.g., data from a global positioning system (GPS)) immediately upon power loss. For example, location data is transmitted using the low-power message queueing telemetry transport (MQTT) protocol or using the short message system (SMS) protocol. In various embodiments, transmission from the vehicle event recorder uses a low power protocol, a low bandwidth protocol, a low reliability channel protocol, or any other appropriate communication methodology. All non-essential systems are powered off at that point to maintain the power stored in the vehicle event recorder (e.g., charge stored on capacitors, a small backup battery, etc.) for as long as possible. The receiver system is powered to check for messages (e.g., SMS messages) indicating to transmit data. For example, a message indicates to transmit GPS data, transmit message data, transmit image data, transmit video data, turn on a light, or turn on a sound. In some embodiments, periodically, a transmitter system is powered to provide data according to a schedule. For example, the transmitter system provides data on a periodic schedule or a back-off schedule—for example, the intervals between the times when data are provided become longer and longer according to a schedule. In some embodiments, the system additionally changes its transmission rate based at least in part on data. For example, the system may determine to increase a transmission rate in the event it is determined that GPS data is changing or decrease a transmission rate in the event it is determined that GPS data has not changed for greater than a threshold time. The system for locating after power loss improves the vehicle event recorder system by increasing the likelihood that the vehicle event recorder system will be found in the event that the system is disconnected from power and removed from the vehicle.

Figure 1:
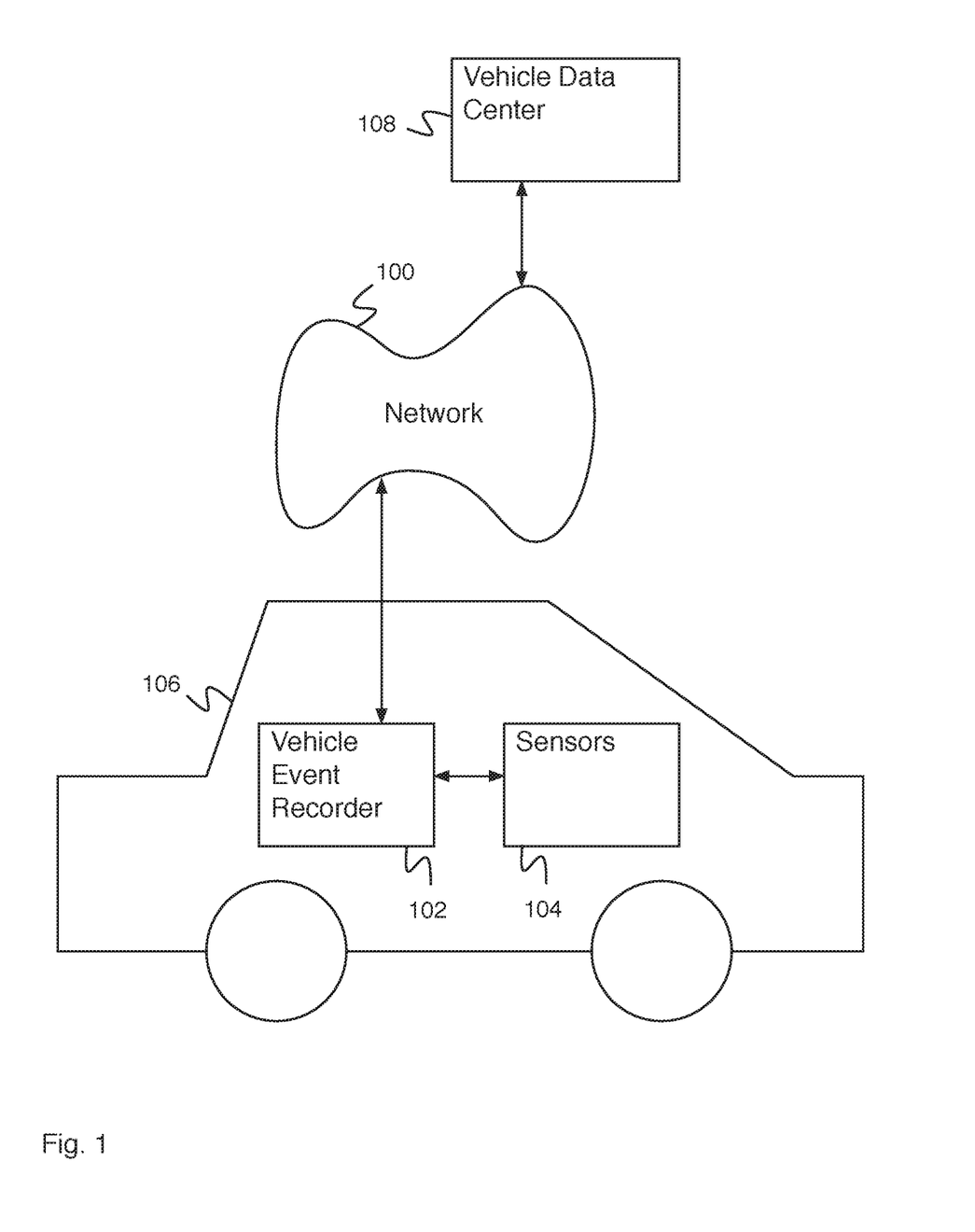
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in a vehicle (e.g., a car or truck). Vehicle event recorder 102 is in communication with vehicle sensors 104. Vehicle sensors 104 comprises a set of sensors, for example, one or more video recorders (e.g., one or more forward facing video recorders, one or more side facing video recorders, one or more rear facing video recorders, one or more interior video recorders, etc.), audio recorders (e.g., one or more exterior audio recorders, one or more interior audio recorders, etc.), accelerometers, gyroscopes, vehicle state sensors, proximity sensors (e.g., a front distance sensor, a side distance sensor, a rear distance sensor, etc.), ADAS sensors (e.g., advanced driver assistance system sensors), a GPS, outdoor temperature sensors, moisture sensors, line tracker sensors (e.g., laser line tracker sensors), a lane change sensor, an America's Missing: Broadcast Emergency Response (AMBER) alert sensor (e.g., a radio configured to receive AMBER alert data), etc. Vehicle state sensors comprise internal vehicle state sensors, for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, an engine control unit (ECU) sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location—for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a Message Queueing for Telemetry Transport (MQTT) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and a cellular data network has a high cost). In some embodiments, network 100 has a different cost at different times (e.g., a higher cost during the day and a lower cost at night). Vehicle event recorder 102 communicates with vehicle data server 108 via network 100.

When vehicle 106 travels, vehicle sensors 104 capture sensor data (e.g., video data, audio data, RADAR data, LIDAR data, accelerometer data, etc.). The sensor data is received by vehicle event recorder 102. For example, sensor data comprises digital data captured at a sampling rate, for example, a sampling rate indicated by vehicle event recorder 102. Vehicle event recorder 102 uses the sensor data to determine events (for example, collision events, hazardous maneuver events, distracted driving events, etc.). Vehicle event recorder 102 additionally uses the sensor data to determine sampling rate for sensor data capture. For example, vehicle event recorder 102 comprises a storage memory and a processor configured to determine, using a first model, one or more sampling rates for a second set of sensors based at least in part on input data from a first set of sensors, wherein the first set of sensors and the second set of sensors are mounted on a vehicle, provide the one or more sampling rates to the second set of sensors, and store data from the second set of sensors in the storage memory.

Figure 2:
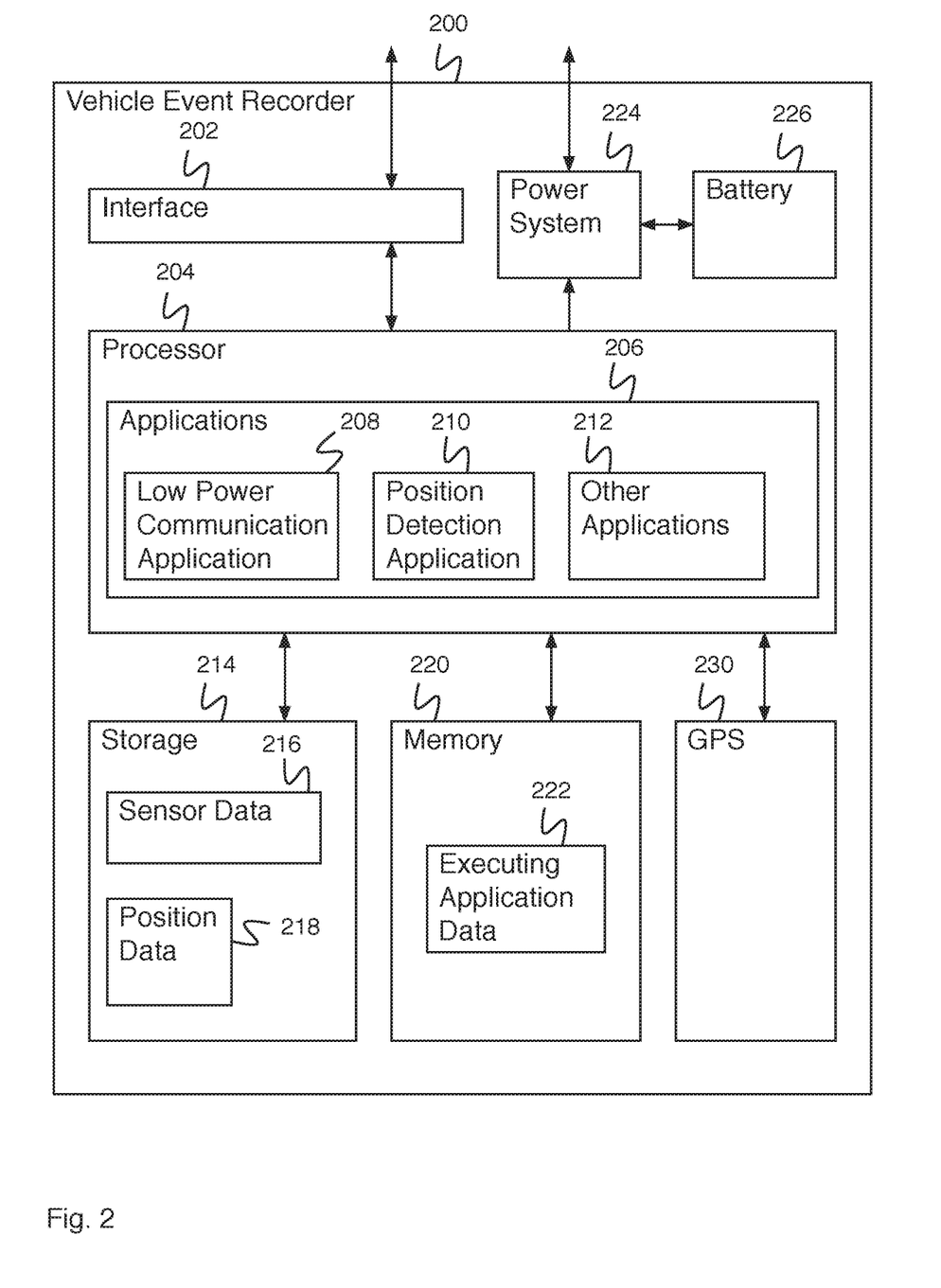
FIG. 2 is a block diagram illustrating an embodiment of a vehicle event recorder.

FIG. 2 is a block diagram illustrating an embodiment of a vehicle event recorder. In some embodiments, vehicle event recorder 200 comprises vehicle event recorder 102 of FIG. 1. In the example shown, vehicle event recorder 200 comprises interface 202. For example, interface 202 comprises an interface for receiving sensor data, receiving network communications, providing location data, providing sensor data, providing communications, etc. Processor 204 comprises a processor for executing applications 206. Applications 206 comprise low power communication application 208, position detection algorithm 210, and other applications 212. Low power communication application 208 comprises an application for communicating data using low power. For example, low power communication application 208 comprises an application for locating vehicle event recorder 200 after power loss. In some embodiments, low power communications application 208 comprises an application configured to determine location information and indicate to transmit the location information. Position detection application 210 comprises an application for determining a position. For example, position detection application 210 comprises an application for using GPS 230 for determining a position. Other applications 212 comprise any other appropriate applications (e.g., a communications application, a data storage and retrieval application, a web browser application, a user interface application, a data analysis application, etc.). Storage 214 comprises system sensor data 216 (e.g., sensor data received from a set of sensors) and position data 218 (e.g., position data captured using position detection application 210). Memory 220 comprises executing application data 222 comprising data associated with applications 206. Power system 224 comprises a power system for receiving power from a vehicle power system and powering the elements of vehicle event recorder 200. Power system 224 powers interface 202, processor 204, storage 214, memory 220, etc. In some embodiments, power system 224 additionally powers a receiver, a transmitter, and sensors. Power system 224 receives instructions from processor 204 for powering systems of vehicle event recorder 200 on or off. Power system 224 receives power from a vehicle battery and/or a vehicle alternator. Power system supplies power to battery 226 for keeping battery 226 properly charged. Battery 226 comprises a battery for providing emergency power to vehicle event recorder 200. In the event power system 224 loses power from the vehicle battery and the vehicle alternator, battery 226 is capable of powering vehicle event recorder 200 for a period of time. In various embodiments, power system 224 and/or battery 226 include capacitors to store charge for powering vehicle event recorder 200.

Figure 3:
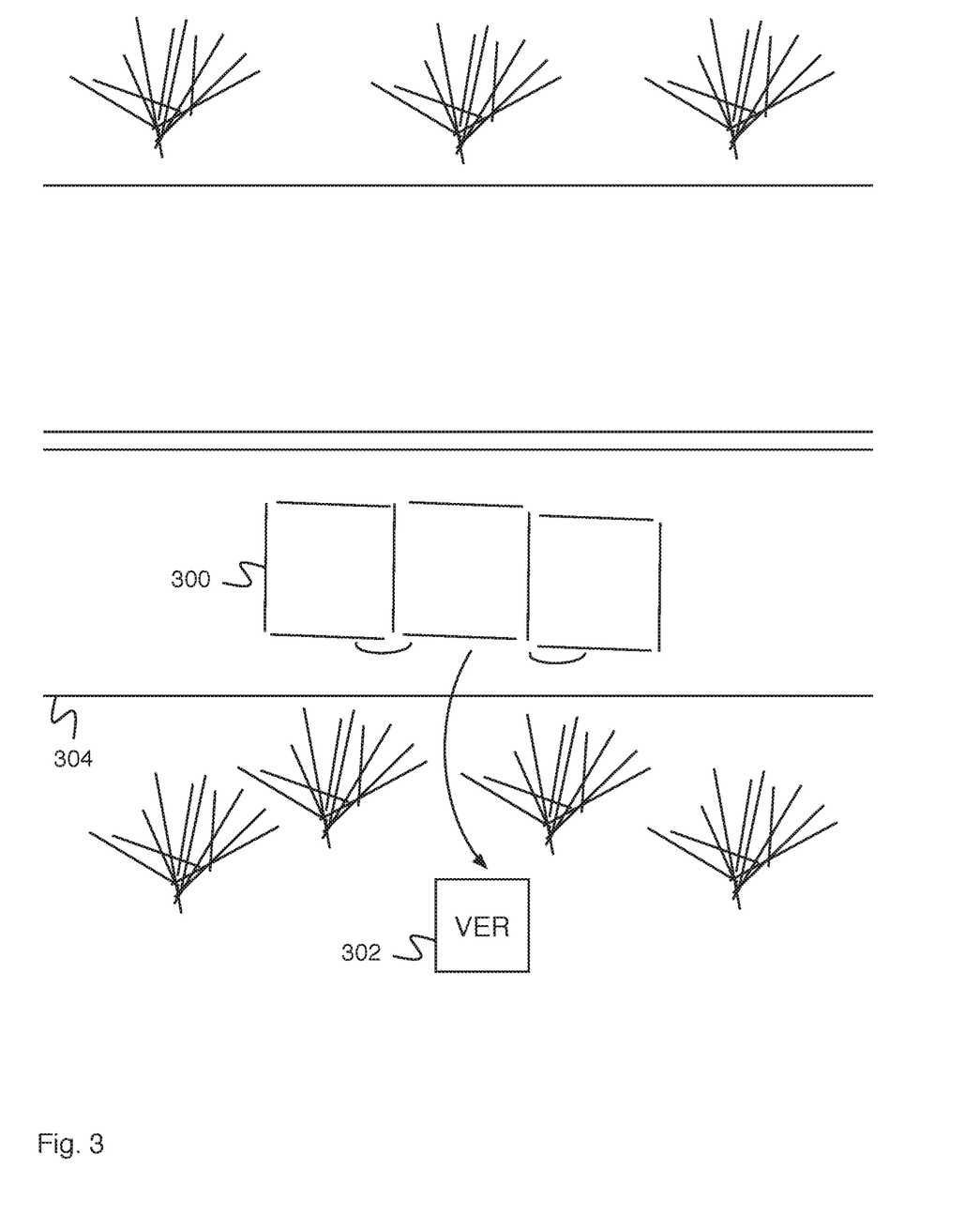
FIG. 3 is a diagram illustrating an embodiment of a vehicle and a vehicle event recorder.

FIG. 3 is a diagram illustrating an embodiment of a vehicle and a vehicle event recorder. In some embodiments, vehicle 300 comprises vehicle 106 of FIG. 1. Vehicle 300 drives down road 304. Vehicle event recorder 302 is disconnected from vehicle 300 and ejected from its window. For example, vehicle event recorder 302 is ejected from the window of vehicle 300 as a result of a driver gone rogue or a vehicle theft. In the example shown, vehicle event recorder 302 lands among bushes on the side of the road. The system for locating the vehicle event recorder 302 after power loss allows vehicle event recorder 302 to broadcast its location, enabling it to be found and the history leading to the ejection event determined.

Figure 4:
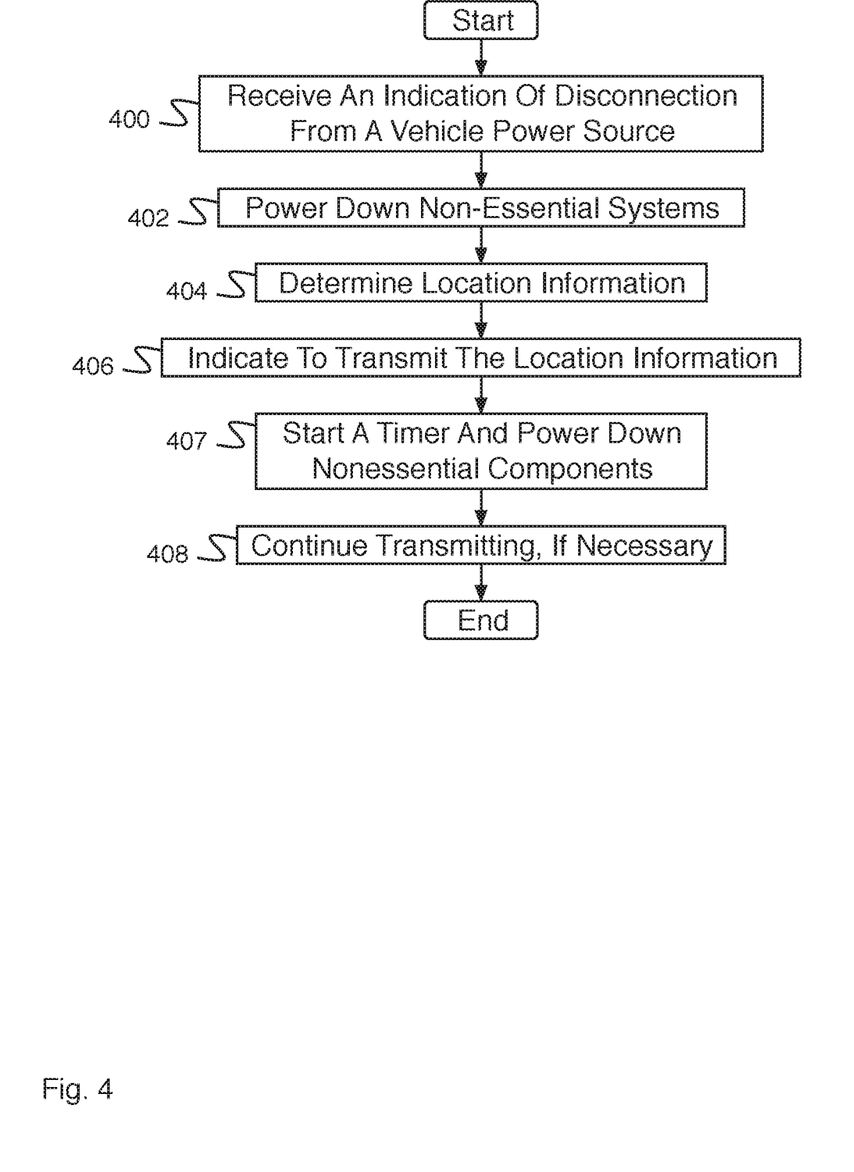
FIG. 4 is a flow diagram illustrating an embodiment of a process for locating after power loss.

FIG. 4 is a flow diagram illustrating an embodiment of a process for locating after power loss. In some embodiments, the process of FIG. 4 is executed by vehicle event recorder 102 of FIG. 1. In the example shown, in 400, an indication of disconnection from a vehicle power source is received. In 402, non-essential systems are powered down. For example, powering down non-essential systems comprises only powering systems required to transmit data. In some embodiments, essential systems comprise power management systems, clock systems, cellular communications systems, sporadic GPS, etc. Sporadic GPS comprises a GPS system configured to only be powered a small fraction of the time. In 404, location information is determined. For example, location information is determined using a GPS. In 406, the process indicates to transmit the location information. In various embodiments, the process indicates to transmit the location information using the MQTT protocol, using SMS, using a cellular data protocol, etc. In some embodiments, the process additionally indicates to transmit image data, video data, message data, audio data, accelerometer data, estimated duration of remaining battery power data, an indication of a power loss, etc. In 407, a timer is started and power down nonessential components. For example, a timer is started to determine a next wake up window and components not required for listening for an SMS message are shut down. In some embodiments, nonessential components comprise a position detection application, other applications, a storage, and a memory (e.g., as shown in FIG. 2). In some embodiments, essential components comprise an SMS message receiver, an interface, a power system, a battery, and a GPS (e.g., as shown in FIG. 2). In 408, the process continues transmitting, if necessary. In some embodiments, continuing to transmit if necessary comprises transmitting the location information on a periodic basis. In some embodiments, data (e.g., the location information) is automatically indicated to be transmitted on a first transmission after the power loss and transmitted on a second or greater transmission after the power loss in response to a request to transmit data.

Figure 5:
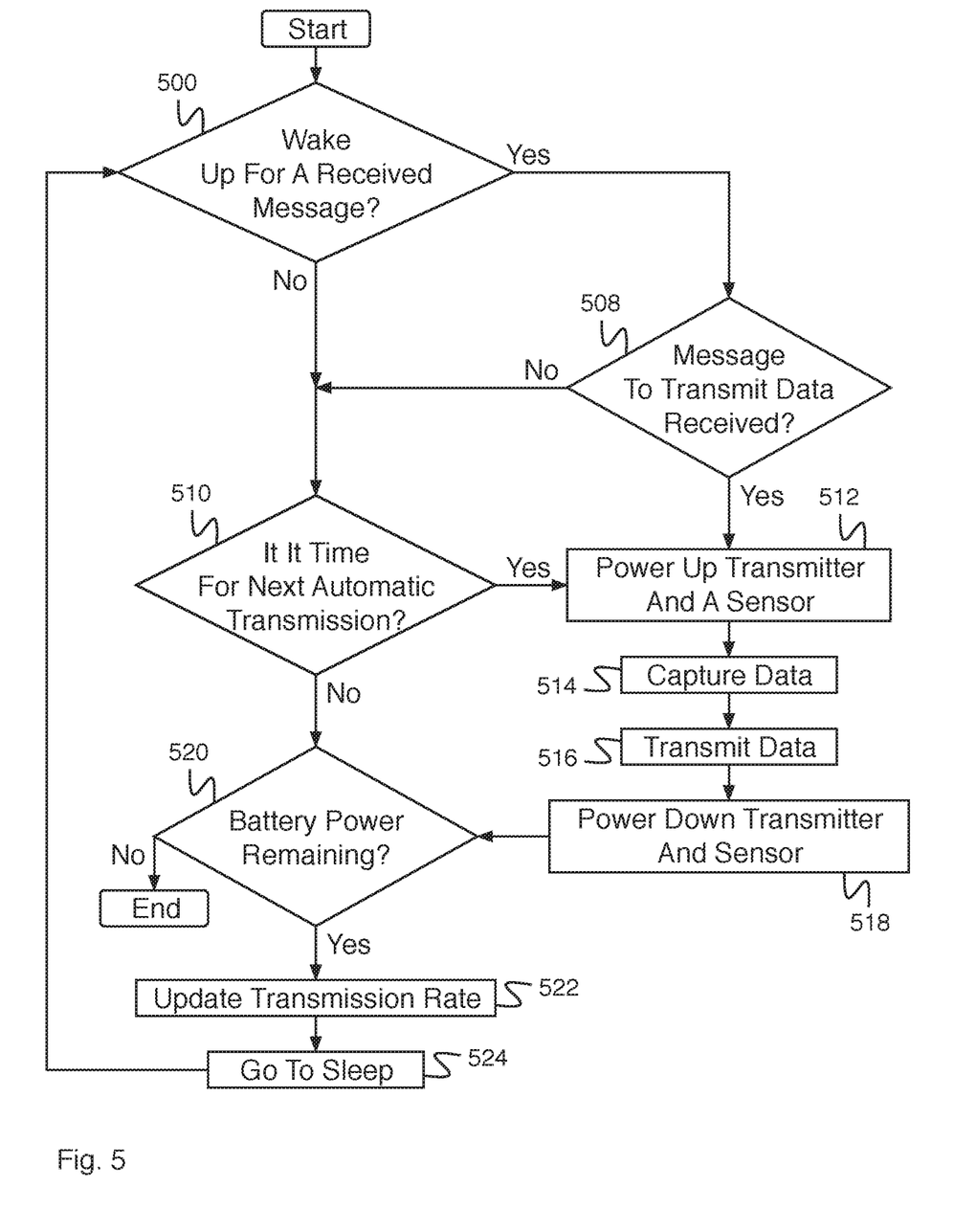
FIG. 5 is a flow diagram illustrating an embodiment of a process for continuing to transmit, if necessary.

FIG. 5 is a flow diagram illustrating an embodiment of a process for continuing to transmit, if necessary. In some embodiments, the process of FIG. 5 implements 408 of FIG. 4. In the example shown, in 500, it is determined whether to wake up for a received message. For example, the unit wakes up and receives and stores an SMS message. In some embodiments, the message is stored to determine a set of actions to perform (e.g., once or periodically to transmit video or an image or location information, to produce a sound, to turn on a light, etc.) In the event it is determined not to wake up for a received message, control passes to 510. In the event it is determined to wake up for a received message, control passes to 508. In 508, it is determined whether a message to transmit data is received. In the event a message to transmit data is received, control passes to 512. In the event a message to transmit data is not received, control passes to 510. In 510, it is determined whether it is time for the next automatic transmission. In some embodiments, automatic transmissions occur on a periodic basis. For example, the next automatic transmission occurs once every minute, once every hour, once every day, once every week, etc. In some embodiments, automatic transmissions occur with a timing backoff. In some embodiments, automatic transmissions occur with a linear backoff—for example, each gap between transmissions is 1 second longer than the last, 5 seconds longer than the last, etc. In another example, automatic transmissions occur with an exponential backoff—for example, each gap between transmissions is 1.1 times longer than the last, 1.5 times longer than the last, etc.

In the event it is determined that it is not time for the next automatic transmission, control passes to 520. In the event it is determined that it is time for the next automatic transmission, control passes to 512. In 512, the transmitter and a sensor are powered up. For example the sensor comprises a GPS, an image sensor, a video sensor, an audio sensor, etc. In 514, data is captured. In 516, data is transmitted. For example, transmitting data comprises transmitting GPS data, transmitting message data, transmitting image data, transmitting video data, turning on a light, or turning on a sound. In 518, the transmitter and sensor are powered down. In 520, it is determined whether there is battery power remaining. In the event it is determined that there is battery power remaining, control passes to 522. In the event it is determined that there is not battery power remaining, the process ends. In 522, the transmission rate is updated. In some embodiments, the system is configured to receive an indication of a transmission rate (e.g., via an interface). In some embodiments, the system is configured to update the transmission rate based at least in part on a location. In 524, the system goes to sleep, and control then passes to 500.

Figure 6:
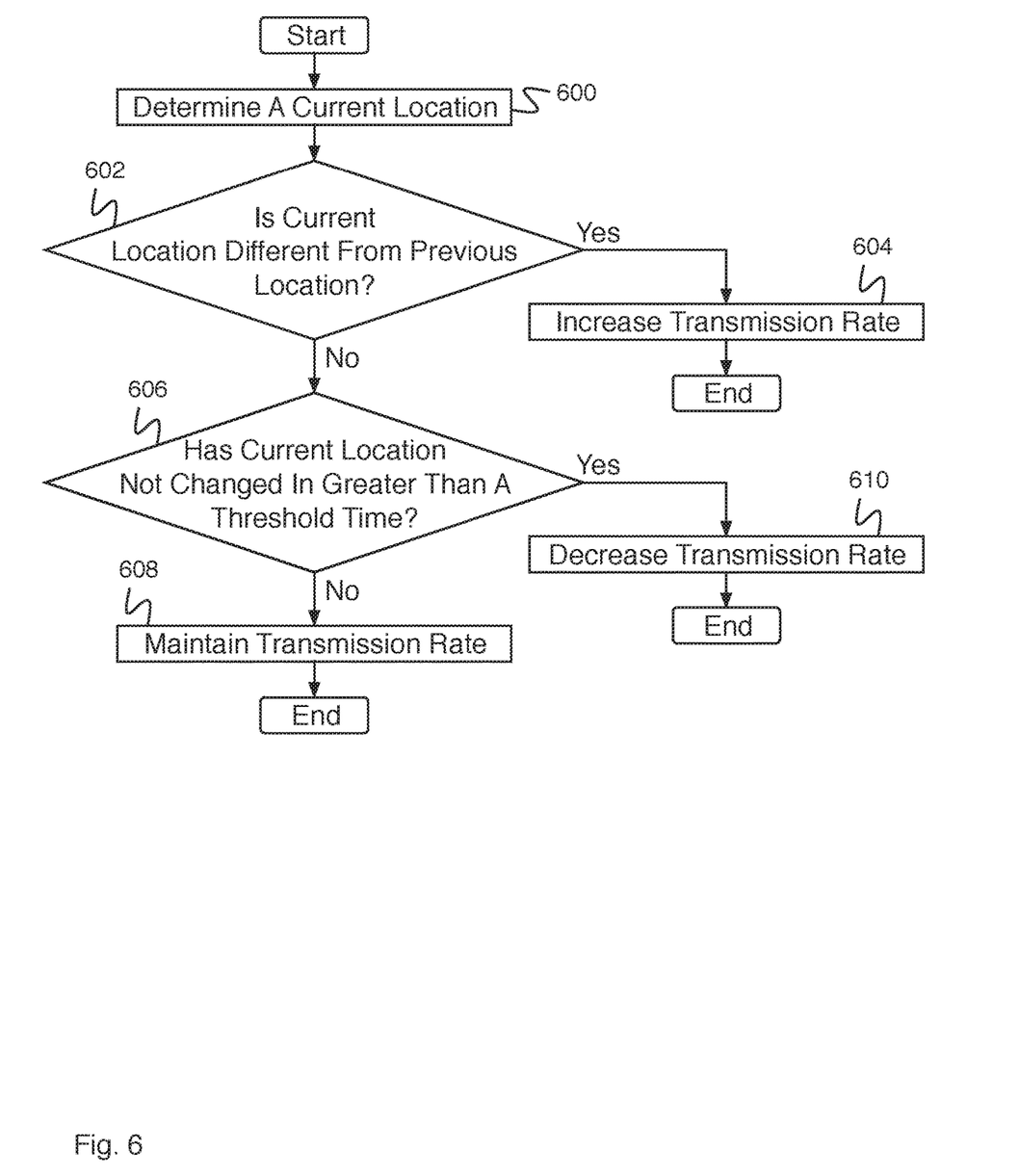
FIG. 6 is a flow diagram illustrating an embodiment of a process for updating a transmission rate.

FIG. 6 is a flow diagram illustrating an embodiment of a process for updating a transmission rate. In some embodiments, the process of FIG. 6 implements 522 of FIG. 5. In the example shown, in 600, a current location is determined. In some embodiments, the current location comprises the location determined the most recent time the location sensor was powered. In 602, it is determined whether the current location is different from the previous location. In the event it is determined that the current location is different from the previous location, control passes to 604. In 604, the transmission rate is increased. In some embodiments, the transmission rate is increased in the event the transmission rate is less than a maximum transmission rate. The process then ends. In 602, in the event it is determined that the current location is not different from the previous location, control passes to 606. In 606, it is determined whether the current location has not changed in greater than a threshold time. In the event it is determined not to be the case that the current location has not changed in greater than a threshold time, control passes to 608. In 608, the transmission rate is maintained, and the process ends. In the event it is determined in 606 that the current location has not changed in greater than a threshold time, control passes to 610. In 610, the transmission rate is decreased.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for locating after power loss, comprising:
an interface configured to:
  receive an indication of disconnection from a vehicle power source; and
a processor configured to:
  determine whether is it time for next automatic transmission;
  in response to a determination that it is the time for the next automatic transmission:
    power up a transmitter and a sensor;

determine location information for a vehicle event recorder using the sensor; and
indicate to transmit the location information using the transmitter; and
power down the transmitter and the sensor;
determine whether there is battery power remaining; and
in response to a determination that there is battery power remaining:
update transmission rate, comprising to:
determine a current location;
compare the current location with a previous location; and
in response to a determination that the current location is the same as the previous location:
maintain a current transmission rate, comprising to:
determine whether the current location has not stayed the same for greater than or equal to a threshold time; and
in response to a determination that the current location has stayed the same for less than the threshold time:
omit maintaining the current transmission rate; and
decrease the transmission rate, wherein the decreasing of the transmission rate relates to an increase in a time gap between the most recent location transmission and a next location transmission.

2. The system of claim 1, wherein the processor is further configured to power down non-essential systems.

3. The system of claim 2, wherein powering down non-essential systems comprises only powering systems required to transmit data.

4. The system of claim 2, wherein essential systems comprise power management systems, clock systems, cellular communications systems, or a sporadic GPS.

5. The system of claim 1, wherein location information is determined using a GPS.

6. The system of claim 1, wherein the processor indicates to transmit the location information using the MQTT protocol.

7. The system of claim 1, wherein the processor is configured to indicate to transmit the location information on a periodic basis.

8. The system of claim 1, wherein the processor is configured to indicate to transmit the location information with a timing backoff.

9. The system of claim 1, wherein the processor is additionally configured to indicate to transmit image data, video data, message data, audio data, accelerometer data, estimated duration of remaining battery power data, or an indication of a power loss.

10. The system of claim 9, wherein the processor is configured to automatically indicate to transmit data on a first transmission after the power loss.

11. The system of claim 10, wherein the processor is configured to indicate to transmit data on a second or greater transmission after the power loss in response to a request to transmit data.

12. The system of claim 1, wherein the interface is further configured to receive a request to transmit data.

13. The system of claim 12, wherein the request comprises a SMS message.

14. The system of claim 13, wherein the interface is configured to listen for a cellular communications system to receive the SMS message.

15. The system of claim 12, wherein transmitting data comprises transmitting GPS data, transmitting message data, transmitting image data, transmitting video data, turning on a light, or turning on a sound.

16. A method for locating after power loss, comprising:
receiving an indication of disconnection from a vehicle power source;
determining whether is it time for next automatic transmission;
in response to a determination that it is the time for the next automatic transmission:
powering up a transmitter and a sensor;
determining, using a processor, location information for a vehicle event recorder;
recorder using the sensor; and
indicating to transmit the location information using the transmitter; and
powering down the transmitter and the sensor;
determining whether there is battery power remaining; and
in response to a determination that there is battery power remaining:
updating transmission rate, comprising:
determining a current location;
comparing the current location with a previous location; and
in response to a determination that the current location is the same as the previous location:
maintaining a current transmission rate, comprising:
determining whether the current location has stayed the same for greater than or equal to a threshold time; and
in response to a determination that the current location has stayed the same for less than the threshold time:
omitting to maintain the current transmission rate; and
decreasing the transmission rate, wherein the decreasing of the transmission rate relates to an increase in
a time gap between the most recent location transmission and a next location transmission.

17. A computer program product for locating after power loss, the computer program product being embodied in a non-transitory computer readable storage medium and comprising computer instructions for:
receiving an indication of disconnection from a vehicle power source;
determining whether is it time for next automatic transmission;
in response to a determination that it is the time for the next automatic transmission:
powering up a transmitter and a sensor;
determining location information for a vehicle event recorder using the sensor; and
indicating to transmit the location information using the transmitter; and
powering down the transmitter and the sensor;
determining whether there is battery power remaining; and
in response to a determination that there is battery power remaining:
updating transmission rate, comprising:
determining a current location;
comparing the current location with a previous location; and
in response to a determination that the current location is the same as the previous location:
maintaining a current transmission rate, comprising:

determining whether the current location has stayed the same for greater than or equal to a threshold time; and in response to a determination that the current location has stayed the same for less than the threshold time:

omitting to maintain the current transmission rate; and decreasing the transmission rate, wherein the decreasing of the transmission rate relates to an increase in a time gap between the most recent location transmission and a next location transmission.

\* \* \* \* \*

UNITED STATES PATENT AND TRADEMARK OFFICE
CERTIFICATE OF CORRECTION

PATENT NO. : 11,276,306 B1
APPLICATION NO. : 16/841470
DATED : March 15, 2022
INVENTOR(S) : Angel Valdes Page 1 of 1

It is certified that error appears in the above-identified patent and that said Letters Patent is hereby corrected as shown below:

In the Drawings

In sheet(s) 5 of 6, figure 5, block 510, delete "It it" and insert --Is it--, therefor.

In the Claims

In Column 8, Line(s) 14, Claim 16, after "event", delete "recorder;".

Signed and Sealed this
Nineteenth Day of July, 2022

Katherine Kelly Vidal
*Director of the United States Patent and Trademark Office*